(No Model.)

E. W. COMEGYS.
CORN HARVESTER.

No. 329,438.

2 Sheets—Sheet 1.

Patented Nov. 3, 1885.

WITNESSES:
W. W. Hollingsworth
W. X. Stevens.

INVENTOR:
E. W. Comegys
BY Munn & Co
ATTORNEYS.

(No Model.) 2 Sheets—Sheet 2.

E. W. COMEGYS.
CORN HARVESTER.

No. 329,438. Patented Nov. 3, 1885.

WITNESSES:
W. W. Hollingsworth
W. L. Stevens

INVENTOR:
E. W. Comegys
BY Munn & Co.
ATTORNEYS.

N. PETERS, Photo-Lithographer, Washington, D. C.

UNITED STATES PATENT OFFICE.

EDWARD WILLIAM COMEGYS, OF EDESVILLE, MARYLAND.

CORN-HARVESTER.

SPECIFICATION forming part of Letters Patent No. 329,438, dated November 3, 1885.

Application filed April 5, 1884. Serial No. 126,793. (No model.)

*To all whom it may concern:*

Be it known that I, EDWARD WILLIAM COMEGYS, a citizen of the United States, residing at Edesville, in the county of Kent and State of Maryland, have invented certain new and useful Improvements in Corn-Harvesters, of which the following is a description.

This invention relates to that class of harvesters which are drawn along the rows of standing corn, cane, &c., to cut and gather the same into bundles; and the object of my invention is to aid a person riding on the machine to control the cutting and gathering into bundles of the corn and stalks of two rows while passing once between the said rows.

To this end my invention consists in the construction and combination of parts forming a corn-harvester hereinafter described and claimed, reference being had to accompanying drawings, in which—

Figure 1:
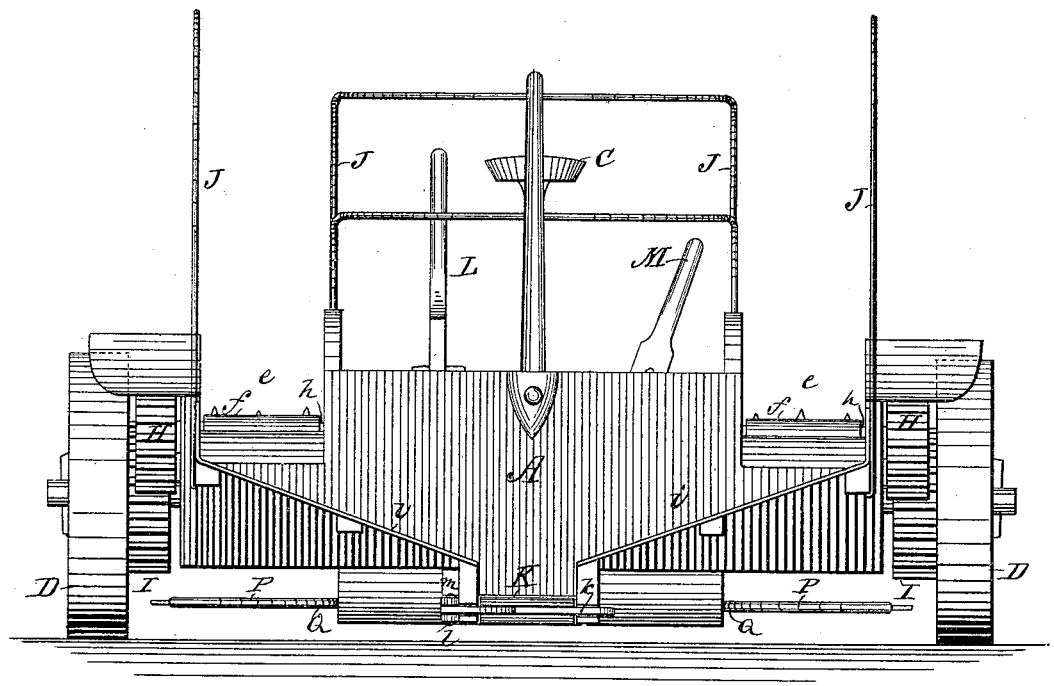
Figure 2:
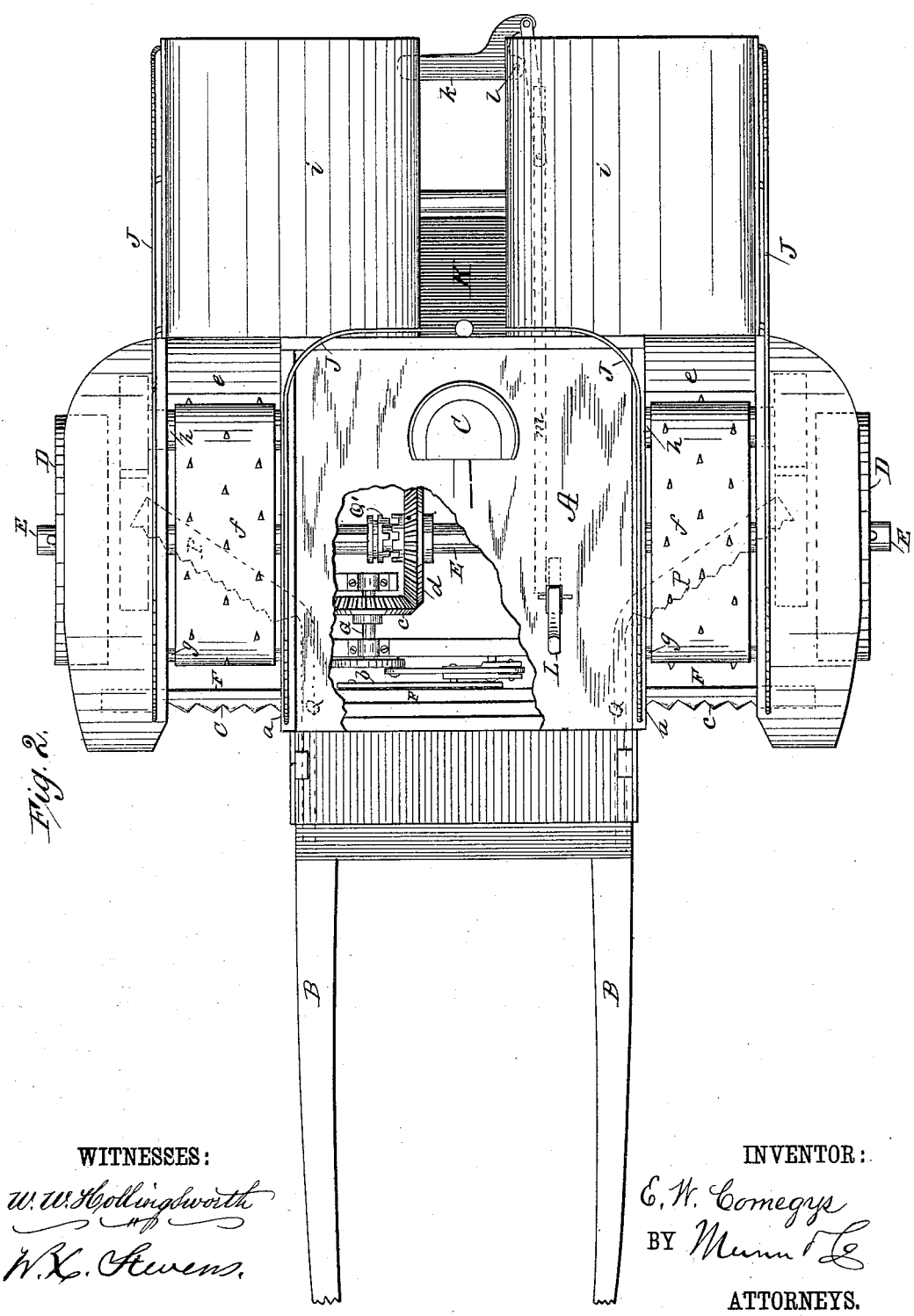

Figure 1 is a rear elevation of my invention; and Fig. 2 is a plan view of the same, part broken away.

A represents the body or frame of the machine, provided with thills B, in which to hitch a horse.

C is the driver's seat. The body is mounted on two wheels, D, which revolve their axle E when moving along.

F is the cutter-bar, mounted in bearings $a$ in the thills B, to reciprocate longitudinally. This bar is armed with two blades, C C, having teeth which incline toward the center of each blade.

G is a shaft having a crank at one end connected by a rod, $b$, with the cutter-bar F and a beveled gear-wheel, $c$, at the other end, which engages a similar gear-wheel, $d$, on the axle E. By this means the rotation of the axle causes the saws to reciprocate. The distance between the centers of the saws corresponds to the distance between the centers of rows of corn, and each saw crosses a trough, $e$, the bottom of which consists of a belt, $f$, which is studded with teeth to engage the cornstalks, and is mounted on two rollers, $g$ and $h$, to be revolved over backward as the machine advances. The roller $h$ is provided with a gear-wheel, H, which engages a gear-wheel, I, on the hub of the wheel D, to revolve the belt. This revolving of the belts carries the standing corn back and allows it to fall on two inwardly-slanting aprons, $i\ i$.

J represents guide-rods to keep the corn from falling sidewise.

K is a platform on which the butt-ends of the corn rest after sliding down the aprons.

$k$ is an arm pivoted to the frame at $l$ to lie across the space between the rear ends of the aprons to support the heads of the fallen corn. This arm is actuated by a rod, $m$, and the lever L, which is within reach of the rider's hand, to discharge the corn when enough is gathered in the aprons to form a bundle or a suitable pile.

M is a hand-lever by which the rider may engage or disengage the device for driving the saws.

The engaging mechanism may be a common splined clutch, Q', engaged with the lever M; or the gear-wheel $d$ may engage the axle E by a spline and be slid along the shaft by the lever M to engage or disengage the wheel $c$.

P P are saw-toothed blades hung near the ground on arms Q. They extend back from the sides of the incline diagonally to the line of travel to cut off the stumps of the cornstalks near the ground. The cutters C are set only as low as the cornstalks are fit for fodder, and the cutters P are lower down, near the ground.

What I claim as my invention, and desire to secure by Letters Patent, is—

1. The combination, with the frame A, the wheels D, and the axle E, of the bar F, the cutter-blades C, mounted thereon, and means, substantially as described, for connecting the bar F with the axle E, the toothed belts $f$, the rollers $g$ and $h$, the gear-wheels H and I, and the guide-rods J, substantially as and for the purpose specified.

2. The combination, with the cutters C, the belts $f$, and guide-rods J, of the slanting aprons $i\ i$, the platform K, the pivoted arm $k$, and the hand-lever L, as and for the purpose specified.

EDWARD WILLIAM COMEGYS.

Witnesses:
JOHN WARD COMEGYS,
BARTON C. LEGG.